(12) United States Patent
Yli-Koski et al.

(10) Patent No.: US 8,146,884 B2
(45) Date of Patent: Apr. 3, 2012

(54) HIGH PRESSURE CONTROL VALVE THAT ALLOWS FOR MULTIPLE PRESSURE DROPS

(75) Inventors: Esko Yli-Koski, Kerava (FI); Pekka Kivipelto, Helsinki (FI)

(73) Assignee: Metso Automation Oy, Helsinki (FI)

( * ) Notice: Subject to any disclaimer, the term of this patent is extended or adjusted under 35 U.S.C. 154(b) by 678 days.

(21) Appl. No.: 12/298,329

(22) PCT Filed: May 8, 2007

(86) PCT No.: PCT/FI2007/050257
§ 371 (c)(1),
(2), (4) Date: Dec. 30, 2008

(87) PCT Pub. No.: WO2007/128880
PCT Pub. Date: Nov. 15, 2007

(65) Prior Publication Data
US 2009/0134351 A1    May 28, 2009

(30) Foreign Application Priority Data

May 8, 2006 (FI) .................................. 20065298

(51) Int. Cl.
*F16K 5/10* (2006.01)
(52) U.S. Cl. ............... 251/209; 251/311; 137/625.3; 137/625.32; 137/625.47
(58) Field of Classification Search ............ 251/205, 251/208, 209, 309, 311; 137/625.32, 625.47, 137/625.3
See application file for complete search history.

(56) References Cited

U.S. PATENT DOCUMENTS

| | | | | |
|---|---|---|---|---|
| 434,094 | A | * | 8/1890 | Schwachheim ......... 137/614.11 |
| 618,051 | A | * | 1/1899 | Bowman et al. ......... 137/625.47 |
| 896,438 | A | * | 8/1908 | Comins ..................... 48/191 |
| 901,621 | A | * | 10/1908 | Jones .......................... 251/161 |
| 1,384,645 | A | * | 7/1921 | Sullivan ................... 137/625.23 |
| 4,406,442 | A | | 9/1983 | Bettin et al. |
| 5,145,150 | A | | 9/1992 | Brooks |

FOREIGN PATENT DOCUMENTS

| | | |
|---|---|---|
| FR | 390 284 | 5/1908 |
| GB | 248684 | 3/1926 |
| GB | 1 534 672 | 12/1978 |
| NL | 8403062 A | 5/1986 |

* cited by examiner

Primary Examiner — John Fristoe, Jr.
Assistant Examiner — Marina Tietjen
(74) Attorney, Agent, or Firm — Oliff & Berridge, PLC

(57) ABSTRACT

This invention relates to a control valve which comprises a first and a second flow channel (2, 3), a valve chamber (4) and a closing member (5), from which a shaft (6) extends. A flow connection is established in the control valve through the inner part of the chamber (4). The flow connection into the chamber (4) and the one out of the chamber (4) are constricted at all openings (A1, A2, A3) when the closing member (5) is turned about the rotation axis (10) in the chamber (4).

12 Claims, 5 Drawing Sheets

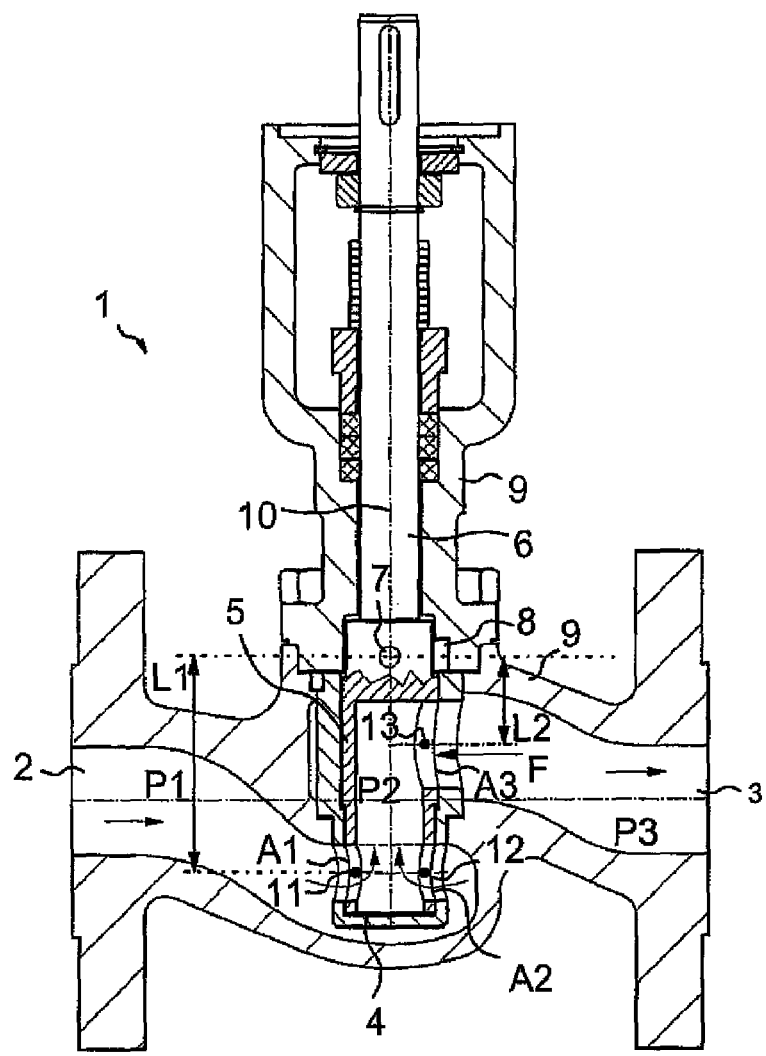
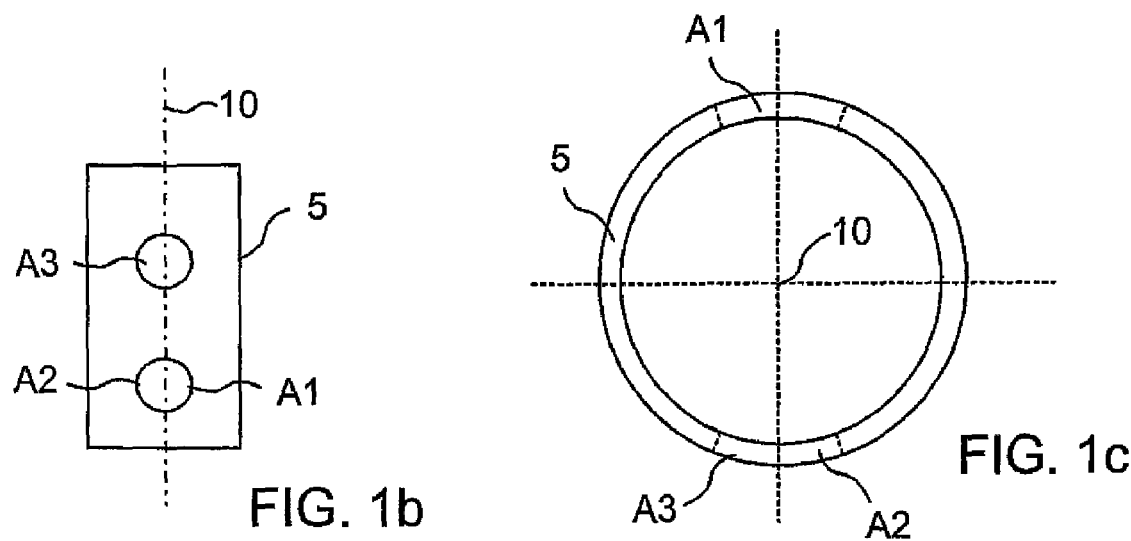

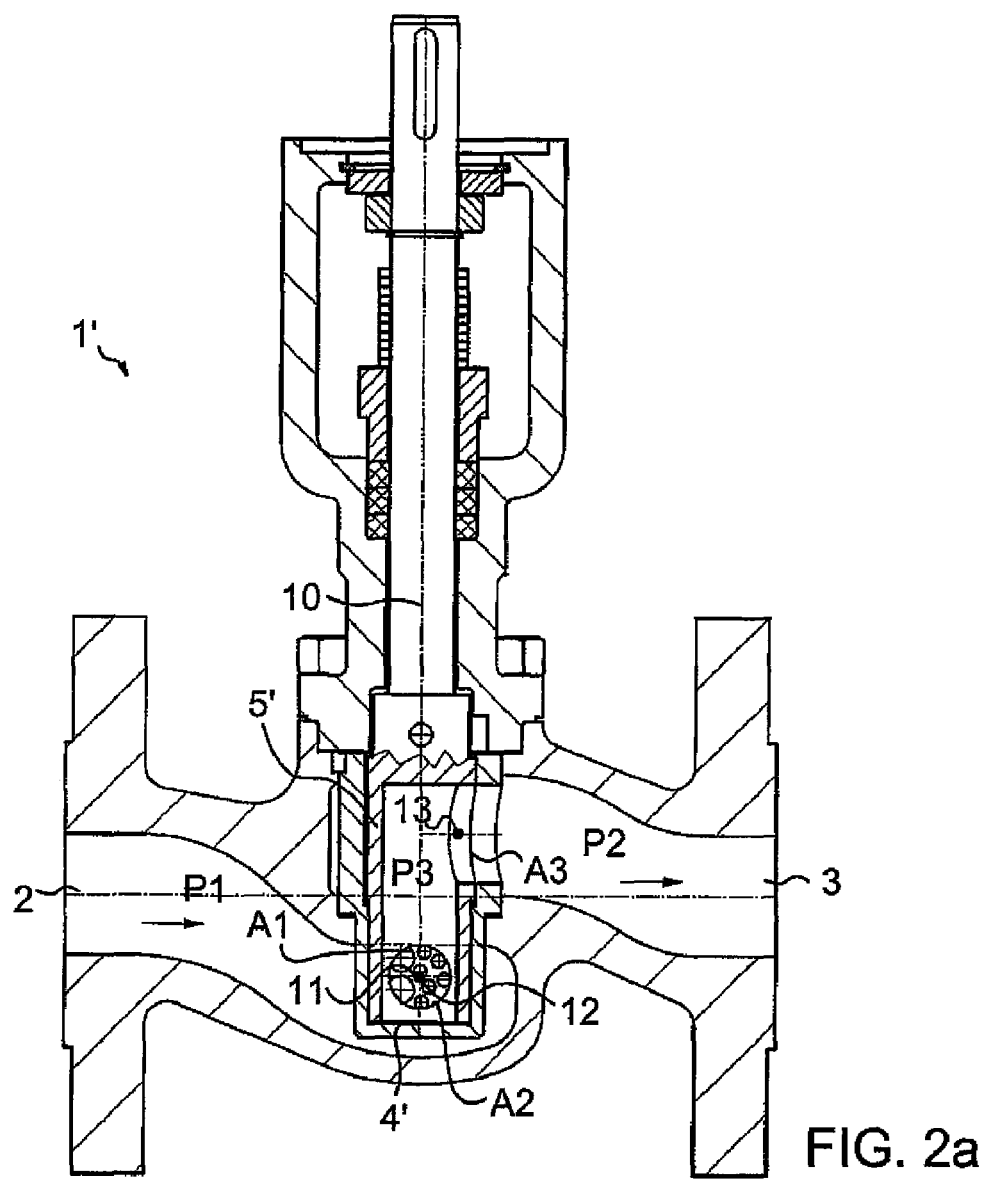
FIG. 2a
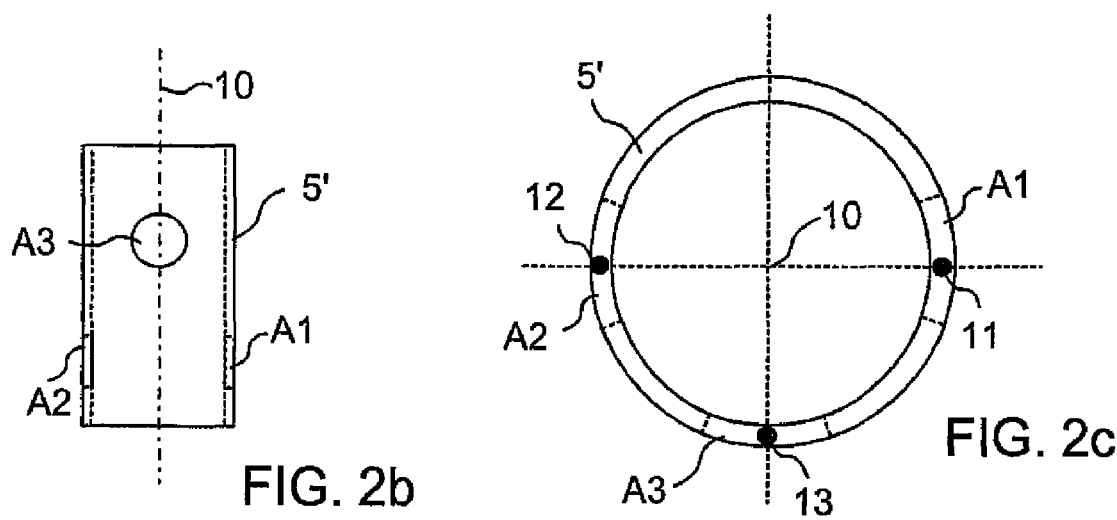
FIG. 2b
FIG. 2c

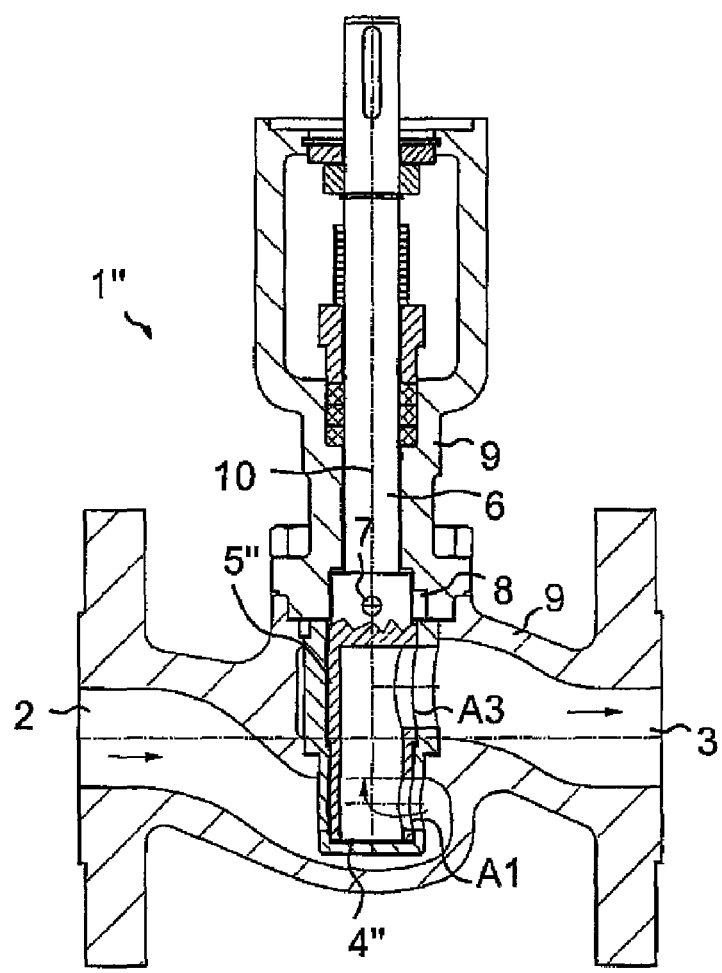
FIG. 3a
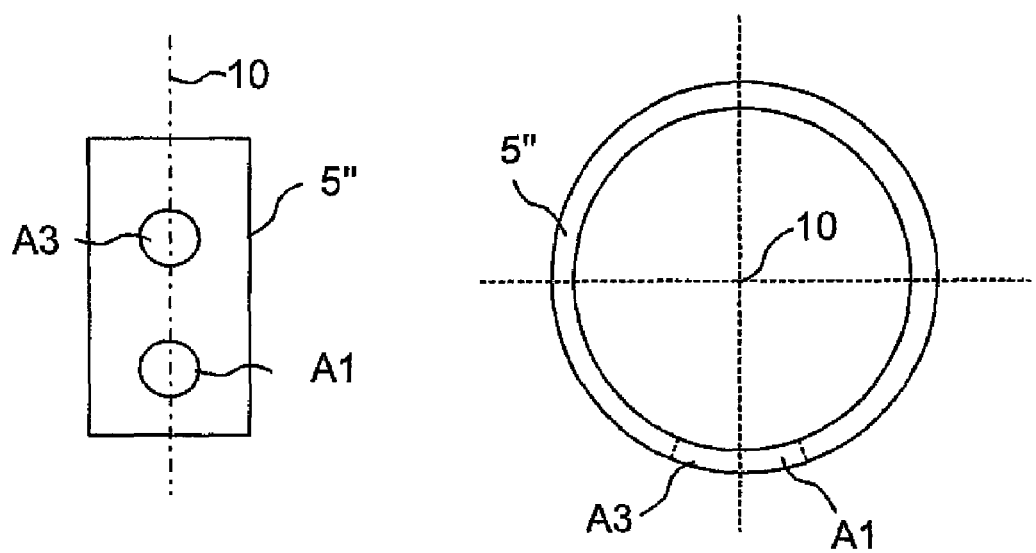
FIG. 3b
FIG. 3c

HIGH PRESSURE CONTROL VALVE THAT ALLOWS FOR MULTIPLE PRESSURE DROPS

FIELD OF THE INVENTION

The invention relates to a control valve particularly suitable for use in connection with high pressures.

DESCRIPTION OF PRIOR ART

In connection with high pressures, the flow constriction by a closing member in a control valve causes internal pressure differences, as a result of which the speed of the flow increases. The increase of the flow speed may, in turn, cause noise, cavitation and erosion, for which reason it is desirable to avoid the increase of the flow speed through structural measures. Furthermore, the operating force required, i.e. the force an actuator must produce for being able to control the flow by means of the valve, should be minimized in the structure of the control valve.

In prior art control valves, satisfactory controlling of the above-mentioned issues by a simple, durable and reliable control valve structure has not been possible.

SUMMARY OF THE INVENTION

The object of the invention is to provide a reliable control valve having a simple structure and suitable for use in applications where pressure is high. This object is achieved by a control valve according to independent claim 1.

In the valve according to the invention, the flow constriction is implemented so that a first pressure drop takes place when the flow moves from a first flow channel into a chamber, and a second pressure drop when the flow moves from the chamber into a second flow channel. Thus pressure changes of individual pressure drops remain small and no excessive increase of the flow speed with its disadvantages occurs. However, when the control valve turns to a completely closed position, actual sealing does not need to occur but at one point, preferably at the outlet opening.

According to the invention, at least one inlet opening is arranged to decrease the force at which the closing member is pressed towards the chamber during the flow, and simultaneously the operating force required to control the flow through the valve.

Preferred embodiments of the control valve according to the invention are disclosed in dependent claims 2 to 12.

BRIEF DESCRIPTION OF THE INVENTION

Figure 4A:
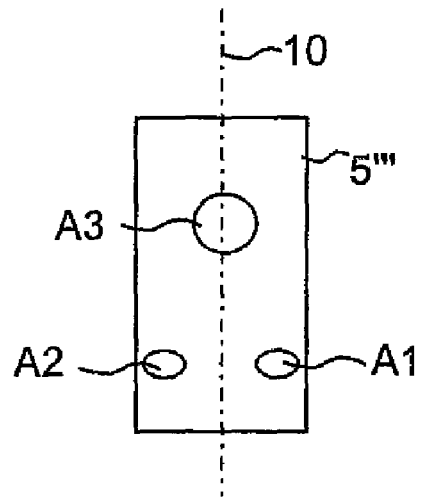
Figure 4B:
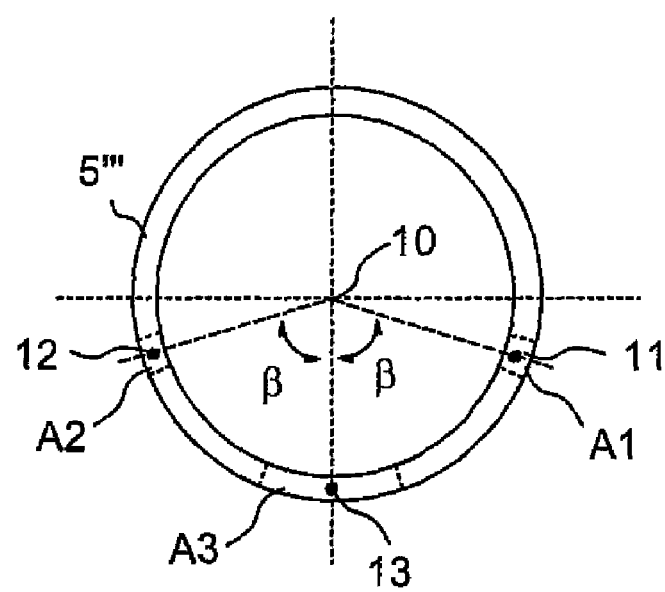
Figure 5:
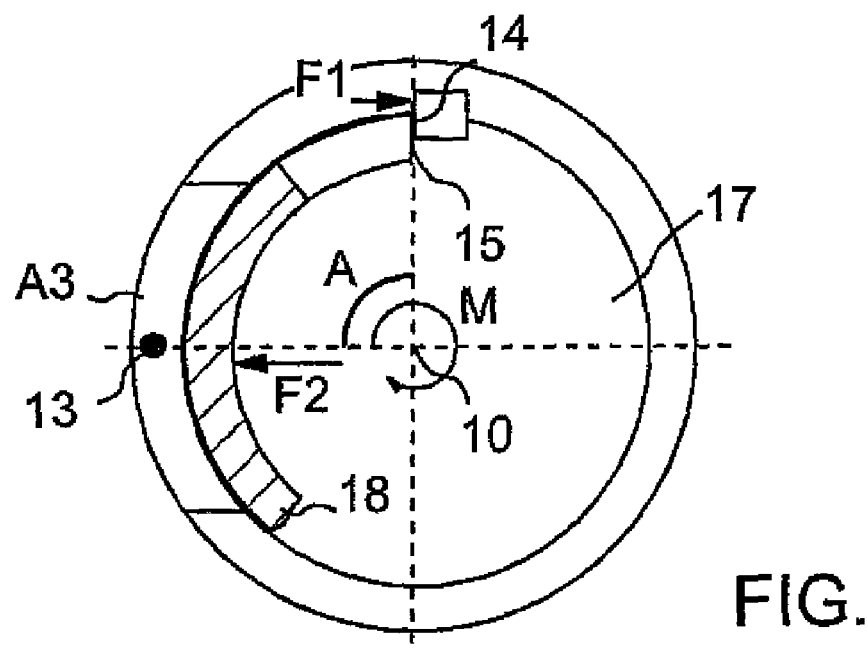
Figure 6:
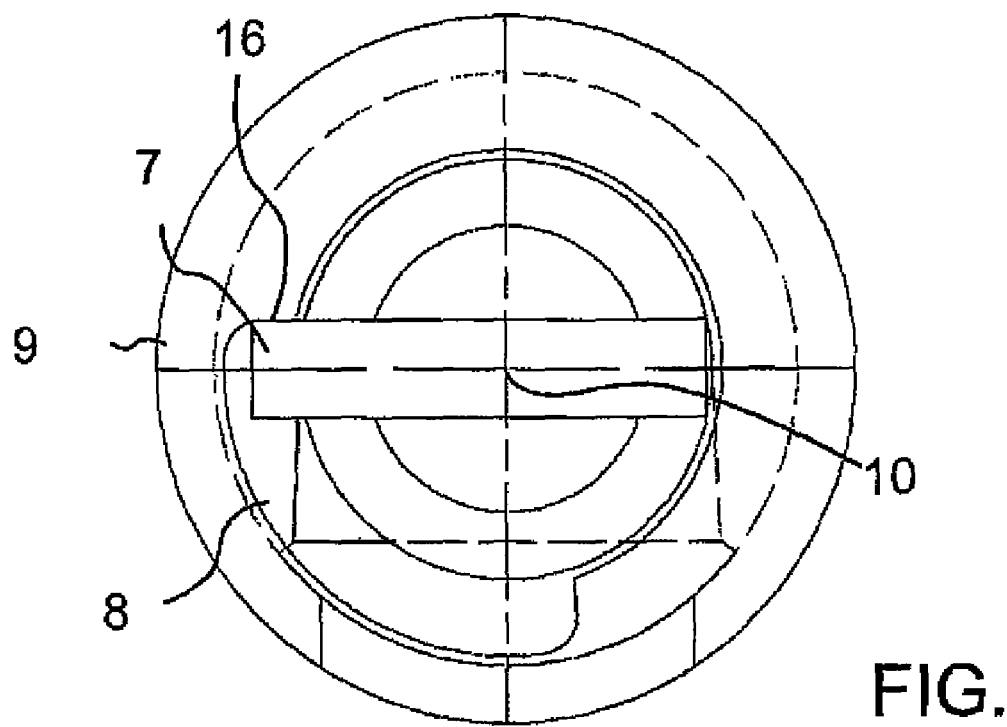

The invention will now be described in greater detail by means of examples with reference to the attached drawings, in which FIGS. 1a to 1c illustrate a first embodiment of a control valve according to the invention, FIGS. 2a to 2c illustrate a second preferred embodiment of a control valve according to the invention, FIGS. 3a to 3c illustrate a third preferred embodiment of a control valve according to the invention, FIGS. 4a and 4b illustrate a fourth preferred embodiment of the invention, FIG. 5 schematically illustrates sealing by means of torque, and FIG. 6 illustrates a counterpart of the control valve according to FIG. 1a.

DESCRIPTION OF AT LEAST ONE EMBODIMENT

FIGS. 1a to 1c illustrate a first embodiment of a control valve according to the invention. The control valve of FIGS. 1a to 1c is suitable for use in applications where pressure is high, for example 100 bar.

In FIG. 1a, the structure of the control valve 1 is illustrated as a partially cross-sectional side view, and FIGS. 1b and 1c are side views illustrating mounting of a first inlet opening A1, a second inlet opening A2 and a discharge opening A3 in a closing member 5, seen in the direction of a rotation axis 10.

The control valve 1 includes a first flow channel 2 and a second flow channel 3, between which a flow connection is arranged through a chamber 4 of the control valve in the situation illustrated in FIG. 1. In the example shown in FIGS. 1a to 1c, the flow connection in the chamber 4 is specifically arranged through the inner part of the closing member 5 arranged in the chamber. According to the invention, it is also thinkable that the shape of the closing member is not a complete cylinder as exemplified in the figures but only "slices" of a cylinder, in which case the closing member has no actual inner part but the flow takes place mainly through the inner part of the chamber.

A shaft 6 extends from the closing member 5, which is attached to the shaft by a pin 7 in this example. The closing member 5 and the shaft 6 are thus provided with aligned openings through which the pin 7 is pushed. One end of the pin 7 extends into a groove 8 for reasons to be explained below in connection with FIG. 6. In this example, the groove 8 is formed in the cover part of the valve body 9, the cover part being attached to the lower part of the valve body 9 by bolts. The closing member 5 and shaft 6 may be turned about the rotation axis 10 by the shaft 6 to constrict the flow path of the control valve (from the situation illustrated in FIG. 1a where the flow path is completely open) and, correspondingly, to expand the flow path of a constricted or even closed control valve.

In the case of FIG. 1a, the closing member 5 and chamber 4 are provided with an inlet opening A1 for establishing a flow connection between the first flow channel 2 and the inner part of the closing member 5. The inlet opening A1 is adjustable, i.e. the flow connection is constricted when the closing member 5 is turned in the chamber so that the free area of the inlet opening enabling the flow decreases. Furthermore, the closing member 5 and chamber 4 are provided with a discharge opening A3 for establishing a flow connection between the inner part of the closing member 5 and the second flow channel 3. It can be seen from FIG. 1a that the inlet opening A1 and the discharge opening A3 are at different heights, i.e. the inlet opening A1 is on first a plane which perpendicularly cuts the rotation axis 10 and the discharge opening A3 is on a second plane which perpendicularly cuts the rotation axis 10, in which case the first and the second plane are at a distance from each other in the direction of the rotation axis 10.

In the case of FIGS. 1a to 1c, the control valve includes a third opening, i.e. a second inlet opening A2, which is below the discharge opening A3 where the opening during the flow decreases the force F that is directed at the closing member 5 when it is pressed towards the chamber 4. The second inlet opening A2 establishes a flow connection between the inner part of the closing member 5 and the first flow channel 2 in the same way as the first inlet opening A1. The second inlet opening A2 is also adjustable, i.e. the flow connection constricts when the closing member 5 is turned in the chamber so that the free area of the inlet opening enabling the flow decreases.

When the closing member 5 is turned in the chamber 4 from the situation illustrated in FIG. 1a, the flow path constricts at all openings A1, A2 and A3. Thus the pressure drop becomes stepwise in the flow situation. Pressure P1 prevails in the first flow channel 2. Pressure P2 prevails inside the closing member, the pressure being lower than P1, and pressure P3 prevails in the second flow channel 3, this pressure being lower than P2. Due to the stepwise pressure drop, the flow speed does not rise to a harmful level.

Even though flow path constriction occurs at all openings A1, A2 and A3, in practice it is sufficient that the tightness required of the control valve is achieved only in connection with the discharge opening A3. Depending on the implementation, the sufficient tightness may be achieved between a metal or a ceramic closing member 5 and a metal or a ceramic chamber 4 wall. Alternatively, suitable sealing material, such as PTFE (PolyTetraFluoroEthylene) may be provided around the discharge opening A3 between the closing member and the chamber wall.

In addition to the stepwise pressure drop, the embodiment of FIG. 1 is advantageous in that it allows substantial cancellation of the forces F between the closing member 5 and the chamber 4, if desired. In this context, the substantial cancellation means that, if desired, force F may in practice be cancelled totally, but due to the sealing of the discharge opening A3 environment, a certain sealing force F is left in the structure in accordance with the invention. Thus, according to the invention, the closing member is designed to, when in a closed position, be sealingly pressed towards the discharge opening or openings of the chamber, if there is more than one opening. In the case of several discharge openings, the discharge openings are preferably arranged in the same half of the closing member so that the pressure inside the closing member and the lower pressure in the second flow channel would enhance sealing. The reduction of the force F has the advantage that the operating force (torque) required to control the valve, i.e. turn the shaft 6, can be minimized.

To cancel force F, the openings A1, A2 and A3 are arranged so that when seen in the direction of the rotation axis 10, the first inlet opening A1 is arranged on the opposite side of the closing member 5 with respect to the discharge opening A3 and the second inlet opening A2 is arranged below the discharge opening A3.

When the openings are arranged as described above, force F can be cancelled by selecting appropriate flow areas of the openings A1, A2 and A3 and distances L1 and L2. When it is assumed that the pin 7 functions as a joint pin about which the closing member may turn, the moment equation will be as follows in the flow situation:

$$A1 \times (P1-P2) \times L1 + A3 \times (P2-P3) \times L2 = A2 \times (P1-P2) \times L1 + F \times L2$$

Thus:

$$F = (A1-A2) \times (P1-P2) \times L1/L2 + A3 \times (P2-P3)$$

In the above equations, A1, A2 and A3 are areas, i.e. areas of the openings that the closing member covers. If the closing member 5 cannot turn about the pin 7 as shown above, the distances L1 and L2 are measured from the connection point of the actuator turning about the shaft 6 to the middle line of the openings. In that case, it is assumed that no actual bearing points exist between the shaft 6 and the body 9.

In the case of FIG. 1a, it is assumed by way of example that the first inlet opening A1 and the second inlet opening A2 are opposite, i.e. they are on the same plane that perpendicularly cuts the rotation axis 10. This is not, however, necessary but the first inlet opening A1 and the second inlet opening A2 may also be at different heights, even though on opposite sides of the closing member 5.

FIGS. 2a to 2c illustrate a second preferred embodiment of the control valve according to the invention. The embodiment of FIGS. 2a to 2c corresponds to a large extent to the embodiment of FIGS. 1a to 1c, for which reason the embodiment of FIGS. 2a to 2c will be described in the following by primarily pointing out differences between the embodiments.

The control valve of FIG. 2a differs from the embodiment of FIG. 1a in respect of the positioning of the openings A1, A2 and A3. Deviating from FIG. 1a, the discharge opening A3 is not above the second inlet opening A2. However, also in this embodiment, the second inlet opening A2 is arranged in the closing member 5' on the opposite side with respect to the first inlet opening A1 when seen in the direction of the rotation axis 10. The first inlet opening A1 and the second inlet opening A2 may be at the same height, i.e. opposite (as illustrated in FIG. 2a) or alternatively at different heights. If the first inlet opening A1 and the second inlet opening A1 are at the same height, their areas preferably correspond to each other, but if they are at different heights, the lower opening preferably has a smaller area.

Seen in the direction of the rotation axis 10, an imagined line passing through the middle points 11 and 12 of the first inlet opening A1 and the second inlet opening A2 and the rotation axis 10 forms a 90-degree angle with an imagined line passing through the middle point 13 of the discharge opening A3 and the rotation axis 10 in the embodiment of FIGS. 2a to 2c.

Due to the above-mentioned 90-degree angle, the medium flowing from the first flow channel 2 into the second flow channel 3 has to change its direction when viewed three-dimensionally so that the medium momentarily flows in the direction of X, Y and Z axes. This further helps keeping the flow speed low, and thus disadvantages caused by too high a flow speed are eliminated.

According to the invention, it is not necessary for the above-mentioned angle to be exactly 90° as illustrated in the figures. In practice, the same advantage is achieved at least when the angle is between 45° and 135°, even though the structure is most efficient when the angle is approximately 90°.

Due to the above-mentioned angle, the total cancellation of the forces between the closing member 5 and the chamber 4 as described in connection with the embodiment of FIGS. 1a to 1c is not achieved in the flow situation. However, when the inlet openings A1 and A2 at the same height are dimensioned so that their flow areas are equal, forces caused by flow path constriction at these openings can be compensated for; otherwise the forces would press the closing member 5' towards the chamber 4'. In other words, in this embodiment the second inlet opening A2 is arranged to reduce the force at which the closing member would be pressed towards the chamber during the flow due to the flow path constriction at the inlet opening A1. Thus only the force caused by the flow path constriction at the opening A3 remains, this force still pressing the closing member 5' towards the chamber 4'. Due to the pressure drop in two phases, the remaining force may, however, be considerably smaller than in a situation where no flow path constriction would occur in connection with the inlet openings A1 and A2.

FIGS. 3a to 3c illustrate a third preferred embodiment of the control valve according to the invention. The embodiment according to FIGS. 3a to 3c corresponds to a large extent to the embodiment of FIGS. 1a to 1c, for which reason the embodiment of FIGS. 3a to 3c will be described in the following by primarily pointing out differences between the embodiments.

In the case of FIGS. 3a to 3c, the closing member 5" and the chamber 4" include only a first inlet opening A1 and a discharge opening A3, i.e. the second separate inlet opening is not necessary in this embodiment. The force at which the closing member 5" is pressed towards the chamber during the flow can be reduced by arranging the inlet opening A1 in the closing member 5" above or below the discharge opening A3 (below in the example of FIG. 3a).

FIGS. 4a and 4b illustrate a fourth preferred embodiment of the invention. The embodiment according to FIGS. 4a and 4b corresponds to a large extent to the embodiment of FIGS. 3a to 3c, for which reason the embodiment of FIGS. 4a and 4c will be described in the following by primarily pointing out differences between the embodiments.

FIGS. 4a and 4b illustrate arrangement of the openings in the closing member 5''' of the control valve. In addition to the first inlet opening A1 and the discharge opening A3, this embodiment comprises a second inlet opening A2. Seen in the direction of the rotation axis 10, the first inlet opening A1 and the second inlet opening A2 are arranged so that, in this embodiment, an imagined line passing through the middle point 11 and 12 of each inlet opening A1 and A2 and the rotation axis 10 forms an angle β smaller than 90° with an imagined line passing through the middle point 13 of the discharge opening A3 and the rotation axis 10. This kind of positioning of the openings A1, A2 and A3 and their suitable dimensioning allows reducing the force at which the closing member 5" is pressed towards the chamber during the flow.

According to the invention, the embodiment illustrated in FIGS. 4a and 4b could include more than the two inlet openings shown. For example, the one larger inlet opening A2 illustrated in the figures can be replaced with two smaller inlet openings. Alternatively, both sides of the discharge opening A3 may be provided with one or more inlet openings in addition to the inlet openings illustrated in the figures.

FIG. 4a illustrates by way of example that the first inlet opening A1 and the second inlet opening A2 are at the same height. This is not, however, necessary but the openings and any additional inlet openings, which are not shown in the figures, may be at different heights.

FIG. 5 schematically illustrates how sealing is achieved by utilizing torque.

When the closing member 18 is turned about the rotation axis 10 into a position where it closes the inlet opening A3 in the chamber wall 17, a counterpart 15 moving with the closing member 18 comes into contact with a fixed counterpart 14. When the closing member is further turned into the closed position by torque M, force F1 is generated at the counterpart pair 14 and 15 and counterforce F2 at the discharge opening A3. The counterforce F2 tries to press the closing member 18 against the edges of the discharge opening A3, in which case the closing member, assisted by force F2, firmly closes the discharge opening A3.

A sufficient sealing force can be generated by a conventional actuator which operates the control valve. The sealing force F2 is at its greatest in the situation illustrated in FIG. 5, i.e. when the imagined line between the middle point 13 of the discharge opening A3 connecting the second flow path to the chamber 17 and the rotation axis 10 and the imagined line between the fixed counterpart 14 and the rotation axis 10 form a 90-degree angle when the control valve is viewed in the direction of the rotation axis 10. However, a sufficiently efficient sealing may also be achieved when the angle is between 70° and 110°. When the angle is larger than 45° to 135°, the sealing force is probably not sufficient.

FIG. 6 illustrates a counterpart pair of the control valve according to FIG. 1a. In the case of FIG. 6, a fixed counterpart 16 is formed of the edge of a groove 8 formed in the control valve body 9. In this embodiment, the counterpart moving with the closing member is formed of the pin 7 by which the closing member is attached to the shaft.

For directing the sealing force at the environment of the discharge opening A3 as efficiently as possible, the moving counterpart is preferably arranged at the end that comes into contact with the closing member of the shaft projecting from the closing member. As in the situation of FIG. 1a, the moving counterpart may be arranged in a space which is in a flow connection with the chamber. Thus it is unnecessary, for example, to use separate seals between the pin 7 and the chamber that could reduce the sealing force generated by the torque.

The above figures illustrate by way of example control valve structures where the inlet opening is always below the discharge opening. However, it should be noted that according to the invention, the control valve may also be designed differently, i.e. so that the inlet opening is above the discharge opening. It should further be noted that in all embodiments one (or more) larger inlet opening or discharge opening may be replaced with several smaller inlet openings or discharge openings.

The above figures also illustrate by way of example embodiments where a cylindrical closing member is employed. Deviating from this, the invention is also applicable to embodiments where the closing member is not cylindrical but conical, for instance.

It should be understood that the above description and the related figures are only intended to illustrate the present invention. Different variations and modifications will be obvious to a person skilled in the art without deviating from the scope of the invention.

The invention claimed is:

1. A control valve comprising:
   a first flow channel and a second flow channel;
   a valve chamber through which the first flow channel is in a flow connection with the second flow channel; and
   a closing member which is arranged in the valve chamber and from which a shaft extends for turning the closing member about a rotation axis in the valve chamber to constrict the flow connection between the first flow channel and the second flow channel, wherein
   the flow connection in the valve chamber is implemented so that, on a first plane cutting the rotation axis perpendicularly the closing member and the valve chamber comprise at least one adjustable inlet opening for establishing a flow connection between the first flow channel and an inner part of the valve chamber, and, on a second plane cutting the rotation axis perpendicularly and arranged at a distance from the first plane in the direction of the rotation axis, at least one discharge opening for establishing a flow connection between an inner part of the valve chamber and the second flow channel,
   the at least one adjustable inlet opening is arranged to reduce a force at which the closing member is pressed towards the valve chamber during the flow, the closing member is designed to, when in a closed position, be sealingly pressed towards the at least one discharge opening of the valve chamber, and
   the flow connection comprises a flow connection into the valve chamber and a flow connection out of the valve chamber that are constricted at all the openings when the closing member is turned about the rotation axis in the valve chamber.

2. The control valve according to claim 1, wherein
the closing member and the valve chamber comprise only one adjustable inlet opening and said at least one discharge opening, and
to reduce the force, the one adjustable inlet opening is arranged in the closing member above or below the at least one discharge opening in the direction of the rotation axis.

3. The control valve according to claim 2, wherein
the closing member and the valve chamber comprise at least a second adjustable inlet opening, and
when seen in the direction of the rotation axis, the one adjustable inlet opening and/or the second adjustable inlet opening are arranged so that an imagined line passing through a middle point of each adjustable inlet opening and the rotation axis forms an angle smaller than 90° with an imagined line passing through a middle point of the at least one discharge opening and the rotation axis.

4. The control valve according to claim 2, wherein
the control valve comprises at least a second adjustable inlet opening arranged on an opposite side of the closing member with respect to the one adjustable inlet opening seen in the direction of the rotation axis, and
when seen in the direction of the rotation axis, an imagined line passing through the middle points of the one adjustable inlet opening and the second adjustable inlet opening and the rotation axis forms an angle of approximately 45° to 135° with an imagined line passing through the middle points of the at least one discharge opening and the rotation axis.

5. The control valve according to claim 4, wherein the angle is approximately 90°.

6. The control valve according to claim 4, wherein the one adjustable inlet opening and the second adjustable inlet opening are opposite, in which case the one adjustable inlet opening and the second adjustable inlet opening are on the same plane that perpendicularly cuts the rotation axis and their areas are equal.

7. The control valve according to claim 1, wherein
the at least one adjustable inlet opening includes a first adjustable inlet opening that is arranged in the closing member on an opposite side of the closing member with respect to the at least one discharge opening seen in the direction of the rotation axis, and
the at least one adjustable inlet opening includes a second adjustable inlet opening arranged in the closing member above or below the at least one discharge opening seen in the direction of the rotation axis.

8. The control valve according to claim 1, further comprising:
a counterpart pair, the counterpart pair includes a moving counterpart that is arranged in the closing member or in the shaft extending from the closing member, the counterpart pair also includes a fixed counterpart that is arranged in a wall of the valve chamber or in a body of the control valve, the counterpart pair restricting rotation of the closing member in the valve chamber by coming into contact with each other when the closing member turns the valve chamber into a position covering the at least one discharge opening, and
when the control valve is viewed in the direction of the rotation axis, an imagined line between a middle point of the at least one discharge opening connecting the second flow path to the valve chamber and the rotation axis and an imagined line between the fixed counterpart and the rotation axis form an angle of approximately 45° to 135°, in which case, torque that rotates the closing member through the shaft so that the closing member covers the at least one discharge opening, generates a force that presses the closing member towards the at least one discharge opening when the counterpart pair come into contact with each other.

9. The control valve according to claim 8, wherein the angle is approximately 70° to 110°.

10. The control valve according to claim 8, wherein the moving counterpart is arranged at an end of the shaft extending from the closing member that comes into contact with the closing member.

11. The control valve according to claim 8, wherein the moving counterpart is arranged in a space which is in a flow connection with the valve chamber.

12. The control valve according to claim 1, wherein the flow connection in the valve chamber is implemented through an inner part of the closing member.

* * * * *